(12) United States Patent
Frye et al.

(10) Patent No.: US 10,391,887 B2
(45) Date of Patent: Aug. 27, 2019

(54) ADJUSTMENT SYSTEM FOR VEHICLE SEAT

(71) Applicant: Faurecia Automotive Seating, LLC, Auburn Hills, MI (US)

(72) Inventors: Dale J. Frye, West Olive, MI (US); Jeffery T. Bonk, Chesterfield, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 353 days.

(21) Appl. No.: 15/375,702

(22) Filed: Dec. 12, 2016

(65) Prior Publication Data

US 2017/0166088 A1 Jun. 15, 2017

Related U.S. Application Data

(60) Provisional application No. 62/266,926, filed on Dec. 14, 2015.

(51) Int. Cl.
*B60N 2/02* (2006.01)
*B60N 2/22* (2006.01)
*B60N 2/06* (2006.01)
*B60N 2/90* (2018.01)
*B60N 2/12* (2006.01)

(52) U.S. Cl.
CPC ......... *B60N 2/0228* (2013.01); *B60N 2/0244* (2013.01); *B60N 2/06* (2013.01); *B60N 2/12* (2013.01); *B60N 2/22* (2013.01); *B60N 2/986* (2018.02); *B60N 2002/0268* (2013.01); *B60N 2002/0272* (2013.01)

(58) Field of Classification Search
CPC .... B60N 2002/0272; B60N 2002/0268; B60N 2/244; B60N 2/0244; B60N 2/0228; B60N 2/986; B60N 2/12; B60N 2/06; B60N 2/22

USPC .......................................... 701/49; 297/217.3
See application file for complete search history.

(56) References Cited

U.S. PATENT DOCUMENTS

| | | | |
|---|---|---|---|
| 4,922,170 A | 5/1990 | Kawasaki | |
| 6,401,021 B1 | 6/2002 | Scally | |
| 6,460,934 B1 | 10/2002 | Langer | |
| 6,509,747 B2 | 1/2003 | Nagai | |
| 7,390,982 B2 | 6/2008 | Schmidt | |
| 7,461,896 B2 * | 12/2008 | Welles | A61B 5/11 297/217.3 |
| 7,575,085 B2 | 8/2009 | Kamizono | |
| 8,960,757 B2 | 2/2015 | Otake | |
| 9,283,869 B2 | 3/2016 | Yamamoto | |
| 9,758,060 B2 | 9/2017 | Kubota | |
| 9,908,440 B2 | 3/2018 | Sugioka | |
| 2003/0090133 A1 * | 5/2003 | Nathan | B60N 2/002 297/217.3 |
| 2006/0217864 A1 | 9/2006 | Johnson | |
| 2007/0063567 A1 | 3/2007 | Nakaya | |
| 2007/0091627 A1 | 4/2007 | Nitawaki | |

(Continued)

OTHER PUBLICATIONS

Office Action dated Feb. 1, 2018 for U.S. Appl. No. 15/079,581; (pp. 1-6).

(Continued)

*Primary Examiner* — Milton Nelson, Jr.
(74) *Attorney, Agent, or Firm* — Barnes & Thornburg LLP

(57) ABSTRACT

A vehicle seat includes a seat bottom coupled to a floor of a vehicle to move relative to the floor and a seat back coupled to the seat bottom to move relative to the seat bottom.

18 Claims, 4 Drawing Sheets

(56) References Cited

U.S. PATENT DOCUMENTS

| | | |
|---|---|---|
| 2008/0256967 A1 | 10/2008 | Errington |
| 2010/0331144 A1 | 12/2010 | Rindfleisch |
| 2011/0275255 A1 | 11/2011 | Au |
| 2011/0316318 A1 | 12/2011 | Yamaguchi |
| 2013/0154319 A1* | 6/2013 | Nouvel .................. B64C 13/00 297/217.3 |
| 2014/0084656 A1 | 3/2014 | Hozumi |
| 2014/0265477 A1 | 9/2014 | Yetukuri |
| 2015/0108818 A1 | 4/2015 | Yamamoto |
| 2017/0101032 A1 | 4/2017 | Sugioka |

OTHER PUBLICATIONS

Chinese Office Action for Chinese App. No. 201510665417.4 dated Sep. 19, 2018, 8 pages.
Office Action dated Oct. 18, 2018 for U.S. Appl. No. 15/375,687 (pp. 1-12).
U.S. Office Action for U.S. Appl. No. 15/079,581 dated Aug. 3, 2017, 14 pages.
2015 Honda Odyssey Owners Guide, published by Honda, copyright 2014, latest revision May 29, 2015, Cover, Table of Contents, and p. 41.
Office Action dated Mar. 28, 2019 for U.S. Appl. No. 15/375,687, (pp. 1-13).

\* cited by examiner

ADJUSTMENT SYSTEM FOR VEHICLE SEAT

PRIORITY CLAIM

This application claims priority under 35 U.S.C. § 119(e) to U.S. Provisional Application Ser. No. 62/266,926, filed Dec. 14, 2015, which is expressly incorporated by reference herein.

BACKGROUND

The present disclosure relates to an occupant support, and particularly to an occupant support embodied as a vehicle seat. More particularly, the present disclosure relates to a vehicle seat movable relative to a floor of a vehicle.

SUMMARY

According to the present disclosure, a vehicle seat is configured to support an occupant of the vehicle above a floor of the vehicle. The vehicle seat includes a seat bottom coupled to the floor of the vehicle to move relative to the floor and a seat back coupled to the seat bottom to move relative to the seat bottom.

In illustrative embodiments, an occupant-support system includes the vehicle seat and a seat-motion system. The seat-motion system is configured to sense input from an occupant and move the vehicle seat based on the input from the occupant. The seat-motion system includes a seat-movement unit, a monitoring unit, and a controller that commands the seat-movement unit to move the seat back, seat bottom, or both in response to input provided by the occupant and sensed by the monitoring unit.

In illustrative embodiments, the seat-input unit includes a first sensor and a second sensor spaced apart from the first sensor. The first sensor is coupled to the vehicle seat and arranged to face toward the occupant. The second sensor is coupled to the vehicle seat and arranged to face away from the occupant. The occupant squeezes both sensors at the same time to send sensor signals to the controller to cause the vehicle seat to move in a predetermined manner as a result of receiving signals from both sensors Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic view of an occupant-support system in accordance with the present disclosure showing that the occupant-support system includes a vehicle seat configured to move relative to a floor of a vehicle and a seat-motion system including a monitoring unit configured to receive user inputs, a seat-movement unit configured to change an arrangement of the vehicle seat, and a controller configured to receive the user inputs and issue commands to the seat-movement unit to move the vehicle seat;

DETAILED DESCRIPTION

Figure 1:
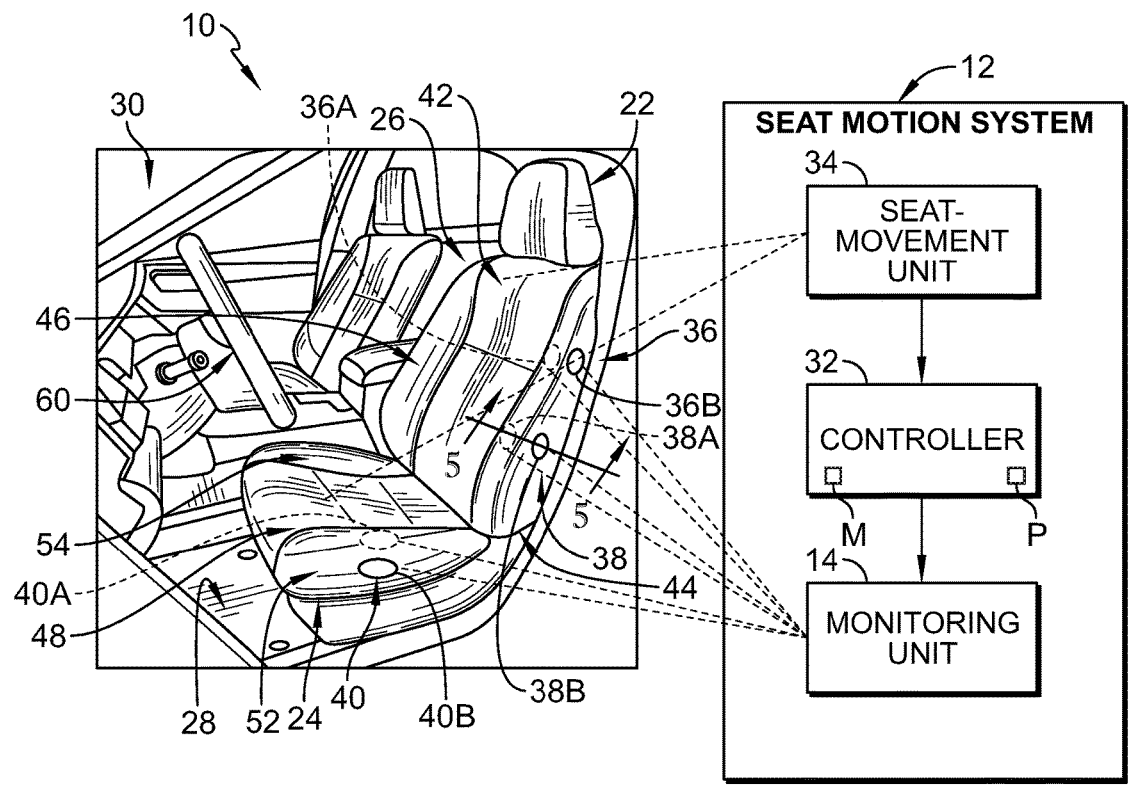
Figure 2:
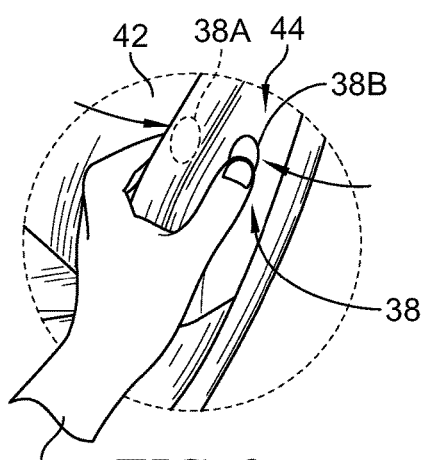
FIG. 2 is an enlarged partial perspective view of FIG. 1 showing that the monitoring unit includes a lower seat-back sensor unit including a forward sensor and a rearward sensor spaced apart from the forward sensor to locate a portion of a seat-back bolster therebetween.
Figure 3:
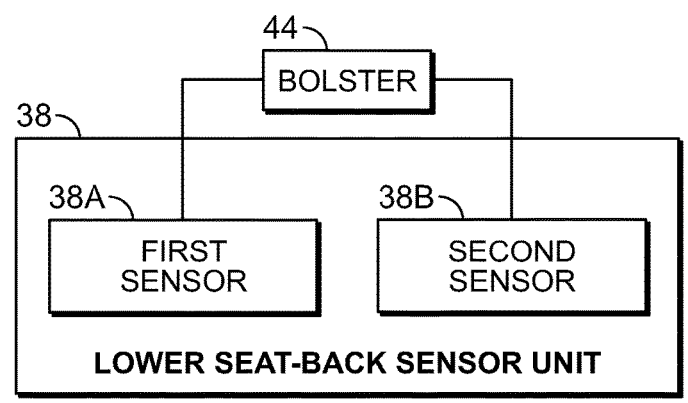
FIG. 3 is a diagrammatic view of a lower seat-back sensor unit included in the monitoring unit showing that each sensor unit includes a first senor and a second sensor spaced apart from the first sensor to locate a portion of the vehicle seat between the sensors.
Figure 6:
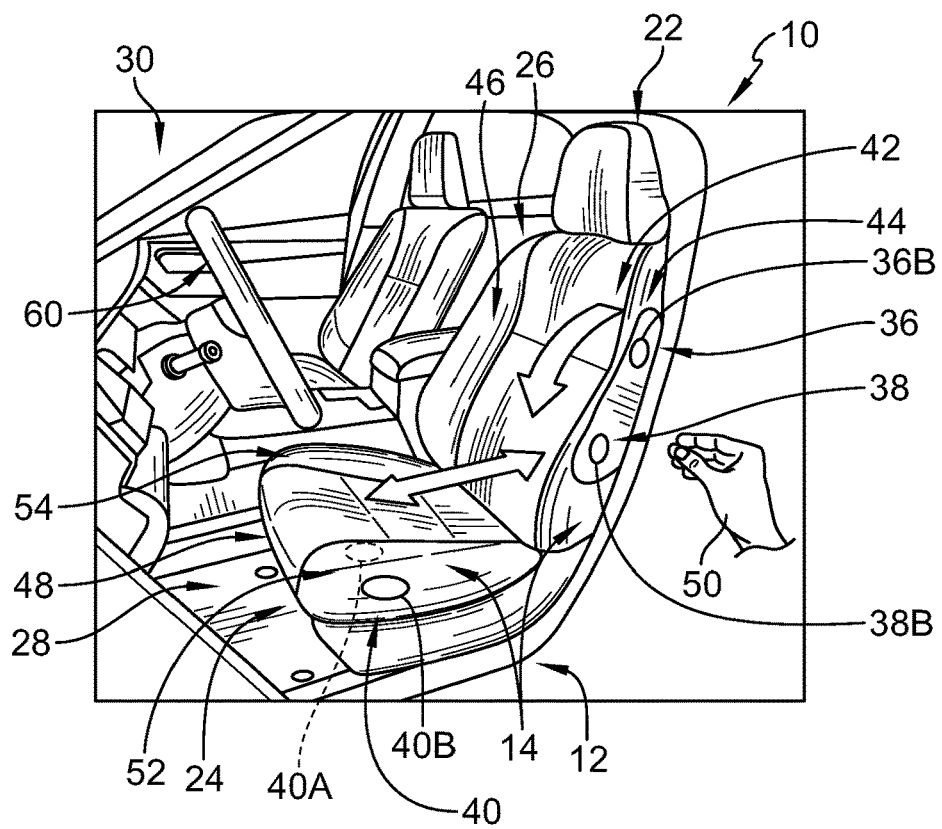
FIG. 6 is a diagrammatic view suggesting that an occupant grasps the lower seat-back sensor unit to cause the seat-movement unit to change the arrangement of the vehicle seat to a rear-seating access arrangement as suggested in FIG. 7.
Figure 7:
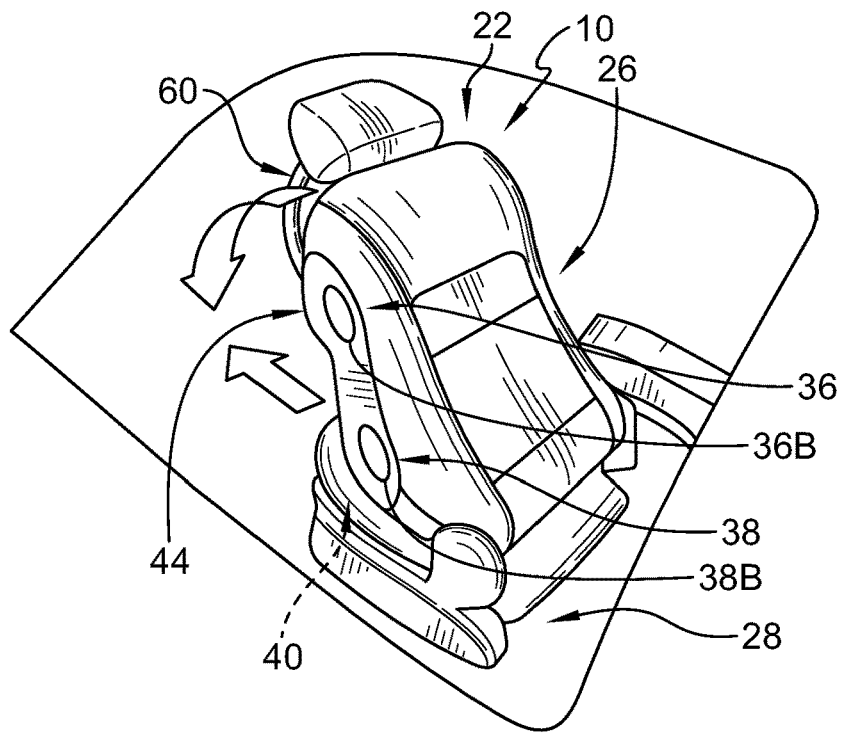
FIG. 7 is a view similar to FIG. 7 showing the vehicle seat moved to the rear-seating access arrangement.

An occupant-support system 10 in accordance with the present disclosure is shown in FIGS. 1, 6, and 7. The occupant-support system 10 includes a vehicle seat 22 and the seat-motion system 12 as shown in FIG. 1. The vehicle seat 22 includes a seat bottom 24 and a seat back 26 as shown in FIG. 1. The seat bottom 24 is coupled to a floor 28 of a vehicle 30 to move relative to the floor 28. The seat back 26 is coupled to the seat bottom 24 to move relative to the seat bottom 24. The seat-motion system 12 is coupled to the vehicle seat 22 and configured to sense input from an occupant 50, interpret the sensed input, and move the vehicle seat 22 to the desired position.

The seat-motion system 12 includes a controller 32, a seat-movement unit 34, and a monitoring unit 14 as shown in FIG. 1. The monitoring unit 14 is configured to be engaged by the occupant 50, sense input from the occupant 50, and send sensor signals indicative of the input to the controller 32. The controller 32 receives the sensor signals, interprets the signals, and sends commands to the seat-movement unit 34. The seat-movement unit 34 receives the commands and causes the vehicle seat 22 to move in response to the commands.

The monitoring unit 14 includes an upper seat-back sensor unit 36, a lower seat-back sensor unit 38, and a seat-bottom sensor unit 40 as shown in FIGS. 1 and 6. The upper seat-back sensor unit 36 is coupled to seat back 26 to locate the lower seat-back sensor unit 38 between the seat bottom 24 and the upper seat-back sensor unit 36 as shown in FIG. 1. The seat-bottom sensor unit 40 is coupled to the seat bottom as shown in FIG. 1. In one example, the occupant 50 engages one of the sensor units 36, 38, 40 at a time to cause the vehicle seat 22 to move as desired by the occupant. In another example, the occupant 50 engages multiple sensor units 36, 38, 40 at a time to cause the vehicle seat to move as desired by the occupant.

The seat back 26 includes a backrest 42, a first seat-back bolster 44, and a second seat-back bolster 46 as shown in FIGS. 1 and 6. First and second seat-back bolsters 44, 46 are coupled to the backrest 42 to locate the backrest 42 between the first and second seat-back bolsters 44, 46. In one example, the first seat-back bolster 44 is located closest to a door of the vehicle and the seat-back sensor units 36, 38 are coupled to the first seat-back bolster 44 so as to provide access to the upper and lower seat-back sensor units 36, 38 to both an occupant sitting in a rear seat of the vehicle and an occupant located outside the vehicle.

The upper seat-back sensor unit 36 includes a first sensor 36A and a second sensor 36B coupled to the first seat-back bolster 44 as shown, for example, in FIG. 1. The first sensor 36A is coupled to the first seat-back bolster 44 and arranged to face toward the occupant 50 when the occupant 50 is resting on the vehicle seat 22. The second sensor 36B is coupled to the first seat-back bolster 44 and arranged to face away from the occupant. Both sensors 36A, 36B are engaged when the occupant squeezes upper seat-back sensor unit 36 causing sensor signals to be sent to the controller 32. Squeezing both sensors 36A, 36B at the same time minimizes sending of unintended sensor signals from only the first sensor 36A when the occupant rests on the vehicle seat 22.

Figure 5:
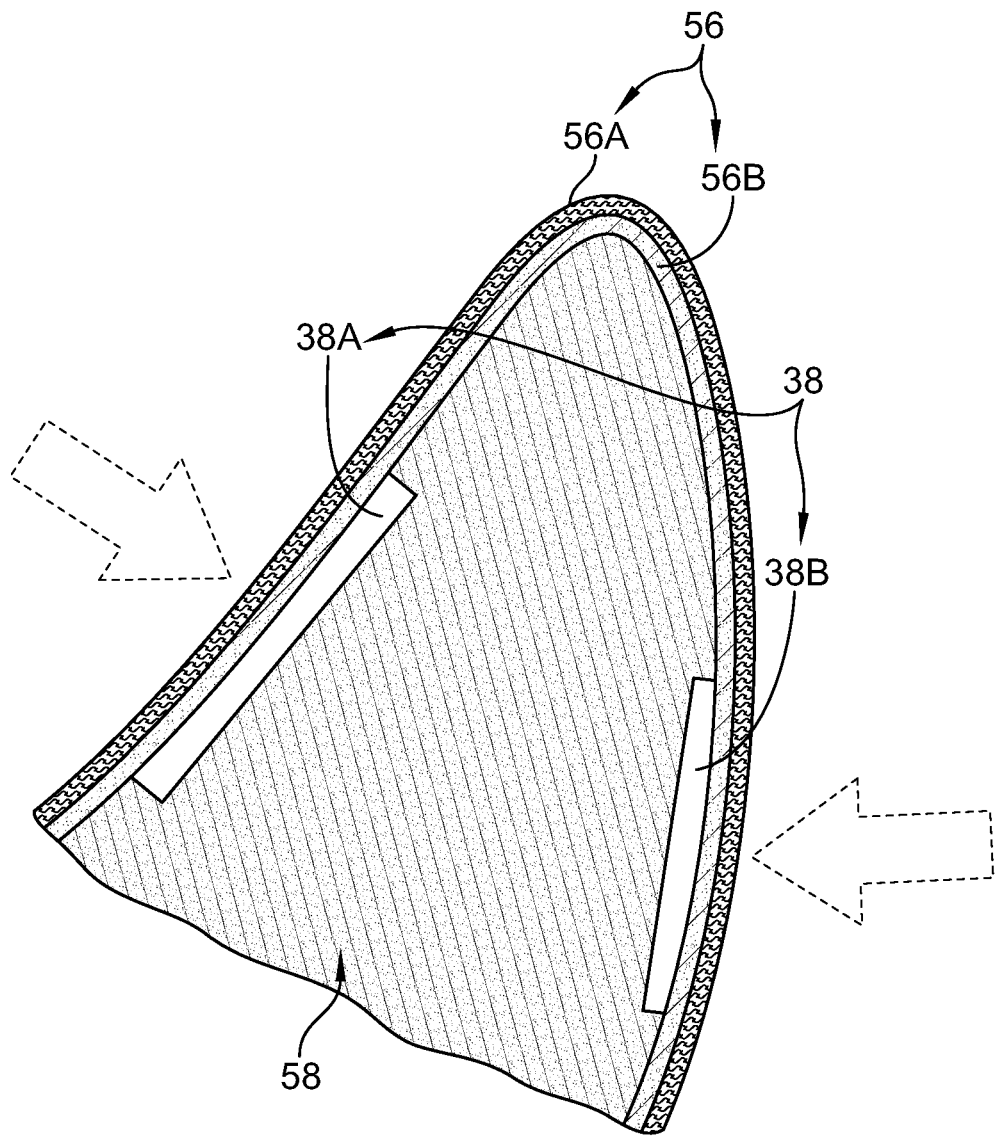
FIG. 5 is a sectional view taken along line 5-5 of FIG. 1 showing that a first sensor is spaced apart below a forward surface of the seat-back bolster and a second sensor is spaced apart below a rearward surface of the seat-back bolster to locate the seat-back bolster cushion between the first and second sensors.

The lower seat-back sensor unit 38 includes a first sensor 38A and a second sensor 38B coupled to the first seat-back bolster 44 as shown, for example, in FIG. 1. The first sensor 38A is coupled to the first seat-back bolster 44 and arranged to face toward the occupant 50 when the occupant 50 is resting on the vehicle seat 22. The second sensor 38B is coupled to the first seat-back bolster 44 and arranged to face away from the occupant. As shown, for example, in FIG. 5, each sensor 38A, 38B is located between trim 56 included in the seat back 26 and a seat-back pad 58 included in the seat back 26. As a result, both sensors 38A, 38B are engaged when the occupant squeezes the lower seat-back sensor unit 38 causing sensor signals to be sent to the controller 32. Squeezing both sensors 38A, 38B at the same time minimizes sending of unintended sensor signals from only the first sensor 38A when the occupant rests on the vehicle seat 22.

In one example, the trim 56 includes an outer layer 56A and an inner layer 56B. The outer layer 56A may be cloth, fabric, leather, synthetic leather, combinations thereof, or any other suitable alternative. The inner layer 56B may be foam, cloth, combinations thereof, or any other suitable alternative. The inner layer 56B is located between the seat-back pad 58 and the outer layer 56A. Any number of suitable layers may be included in the trim 56.

The seat bottom 24 includes a cushion 48, a first seat-bottom bolster 52, and a second seat-bottom bolster 54 as shown in FIG. 1. First and second seat-bottom bolsters 52, 54 are coupled to the cushion 48 to locate the cushion 48 between the seat-bottom bolsters 52, 54. In one example, the first seat-bottom bolster 52 is located closest to the door of the vehicle and the seat-bottom sensor unit 40 is coupled to the first seat-bottom bolster 52 so as to provide access to the seat-bottom sensor unit 40 to an occupant located outside the vehicle or an occupant resting on the vehicle seat 22.

The seat-bottom sensor unit 40 includes a first sensor 40A and a second sensor 40B coupled to the first seat-bottom bolster 52 as shown, for example, in FIG. 1. The first sensor 40A is coupled to the first seat-bottom bolster 52 and arranged to face toward the occupant when the occupant is resting on the vehicle seat 22. The second sensor 40B is coupled to the first seat-bottom bolster 52 and arranged to face away from the occupant. Each sensor 40A, 40B is located between trim included in the seat bottom 24 and a seat-bottom pad included in the seat bottom 24. Both sensors 40A, 40B are engaged when the occupant squeezes the seat-bottom sensor unit 40 causing sensor signals to be sent to the controller 32. Squeezing both sensors 40A, 40B at the same time minimizes sending of unintended sensor signals from only the first sensor 40A when the occupant rests on the vehicle seat 22.

In one example of use, an occupant 50 standing outside the vehicle and adjacent to the vehicle seat 22 reaches down and squeezes the lower seat-back sensor unit 38 as suggested in FIG. 6. The occupant 50 desires to translate the vehicle seat 22 relative to the floor 28. Both sensors 38A, 38B detect force applied to the sensors and associated sensor signals are sent to the controller 32. The controller 32 receives both sensor signals. Software or instructions stored on memory (M) included in controller 32 is executed by a processor (P) included in the controller 32 using the sensor signals. The controller 32 determines that the occupant 50 intended to translate the vehicle seat 22 because both sensor signals came from the lower seat-back sensor unit 38. The controller 32 then issues a command to the seat-movement unit 34 to translate the vehicle seat 22 relative to the floor 28 or release a track lock allowing the vehicle seat 22 to move in response to force applied by the occupant. Reference is hereby made to U.S. patent application Ser. No. 15/079,581 filed Mar. 24, 2016 and entitled VEHICLE SEAT for disclosure relating to movement mechanisms for moving a vehicle seat, which application is hereby incorporated in its entirety herein.

In another example of use, an occupant 50 standing outside the vehicle and adjacent to the vehicle seat 22 or an occupant sitting in a rear vehicle seat squeezes the upper seat-back sensor unit 36 as suggested in FIG. 7. The occupant 50 desires to cause the vehicle seat to move from the use arrangement of FIGS. 1 and 6 to a rear-seating access arrangement as shown in FIG. 7. The occupant 50 squeezes both sensors 36A, 36B included in upper seat-back sensor unit 36 to cause the vehicle seat 22 to translate forward toward a steering wheel 60 and the seat back 26 to pivot forward toward the seat bottom 24 to assume the rear-seating access arrangement. Both sensors 36A, 36B send a sensor signal to the controller 32 indicating the upper seat-back sensor unit 36 has been squeezed.

The controller 32 receives both sensor signals. Software or instructions stored on memory (M) included in controller 32 is executed by a processor (P) included in controller 32 using the sensor signals. Controller 32 determines that the occupant 50 intended move the vehicle seat 22 to the rear-seating access arrangement because of the combination of forces imparted on the upper seat-back sensor unit 36. Controller 32 then issues a command to the seat-movement unit 34 to move the vehicle seat 22.

In another example of use, the occupant 50 desires to raise the seat bottom 24 relative to the floor 28 as suggested in FIG. 1. The occupant 50 squeezes the seat-bottom sensor unit 40 and pulls upwardly on the seat bottom 24. The first and second sensors 40A, 40B detect the force applied to both and send sensor signals to the controller 32. The first sensor 40A detects a first force and the second sensor 40B detects a second force greater than the first force as a result of the occupant pulling up on the seat bottom 24 to raise the seat bottom.

The controller 32 receives both sensor signals. The controller 32 determines that the occupant 50 intended to raise the seat bottom 24 because both sensors 40A, 40B of the seat-bottom sensor unit 40 are engaged and the second sensor 40B has a larger force applied than the first sensor 40A. The controller 32 then issues a command to the seat-movement unit 34 to tilt upwardly the front portion of the vehicle seat 22 relative to the floor 28.

Figure 4:
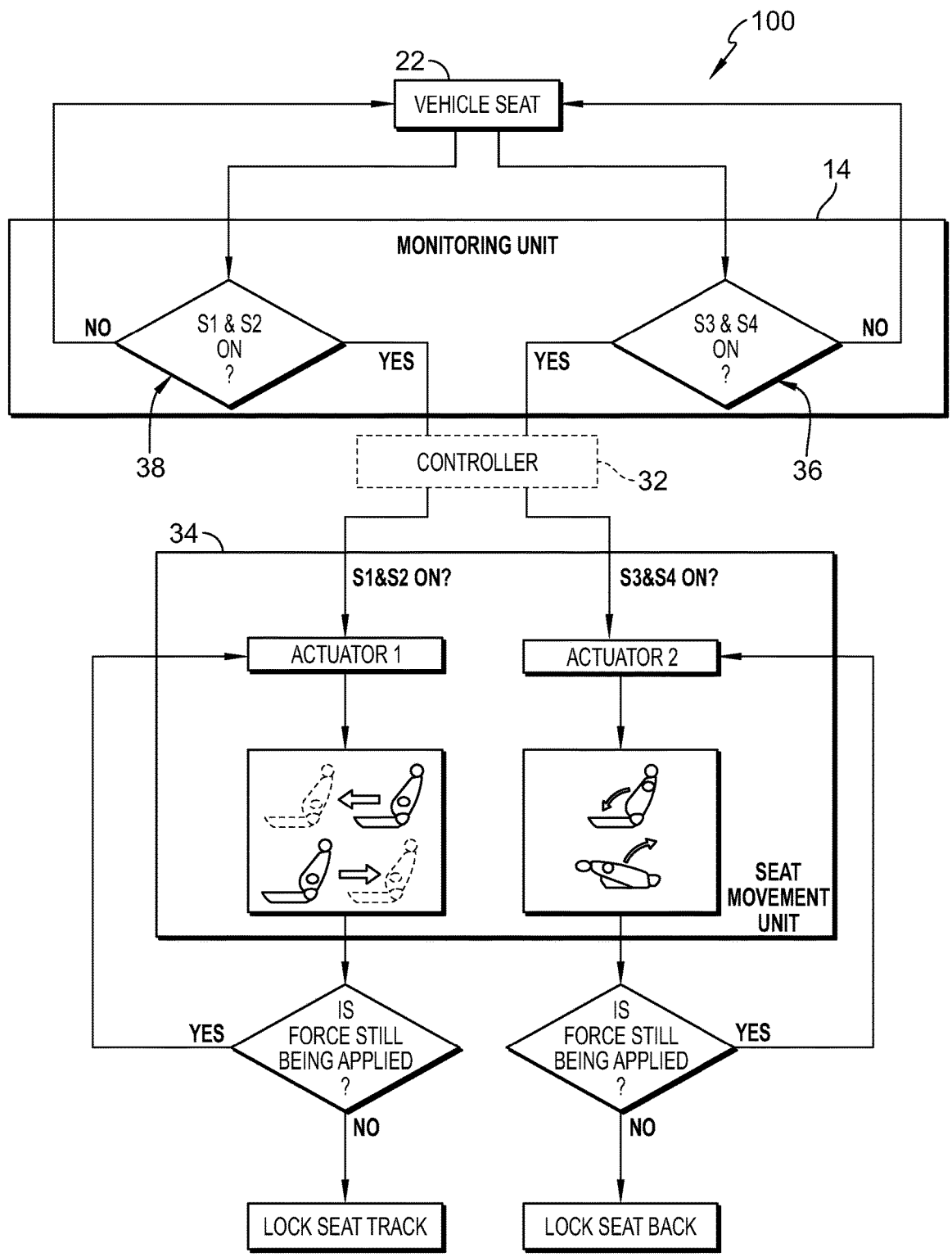
FIG. 4 is a diagrammatic view of the occupant-support system of FIG. 1 showing an illustrative method of operating the occupant-support system using the seat-motion system.

As shown, for example, in FIG. 4, a diagrammatic flow chart 100 shows one illustrative process for how an occupant might adjust the vehicle seat using the seat-motion system 12. The process 100 begins with the monitoring unit 14 detecting force applied to the upper or lower seat-back sensor units 36, 38. Those signals are communicated to the controller 32 which interprets the sensor signals and sends commands to actuators included in the seat-movement unit 34. If force is still being detected by the sensors, the actuators continue to move the vehicle seat. If force is no longer being detected, the vehicle seat is locked in place.

In one example, the controller 32 looks for force to be applied to both sensors included in the sensor unit before the controller will issue a command to the seat-movement unit. However, the controller may continue to issue commands to the seat-movement unit if one of the sensors stops detecting force but the other sensor continues to detect force. In this example, the occupant may have grasped the sensor unit to engage the controller and then continued only pushing on one of the sensors to move the seat bottom up or down or pivot the seat back forward or backward as an example. This example overcomes issues associated with unintended sensor signals coming from the first sensors as result of the occupant sitting on the vehicle seat and engaging the first sensors by accident while still allowing for only one sensor to provide seat-movement control.

The controller 32 may be configured to interpret sensor signals received from different sensor units differently. In one example, squeezing the upper seat-back sensor unit causes the vehicle seat to move from the use arrangement to the rear-seating access arrangement when no occupant is detecting sitting in the vehicle seat by an occupancy sensor. Squeezing the same upper seat-back sensor unit causes the vehicle seat to move from the rear-seating access arrangement to the previous use position when the vehicle seat begins in the rear-seating access arrangement. In one example, squeezing the lower seat-back sensor unit may cause the seat back to pivot relative to the seat bottom. In another example, squeezing the lower seat-back sensor unit may cause the vehicle seat to translate relative to the floor. In one example, squeezing the seat-bottom sensor unit and pulling the seat bottom forward may cause the vehicle seat to translate relative to the seat bottom. In another example, squeezing the seat-bottom sensor unit and pulling up or down on the seat bottom may change a height of the seat bottom relative to the floor. Any suitable combination of the vehicle-seat adjustments may be used.

In one example, sensors in accordance with the present disclosure may be flex sensors, strain gauges, load cells, piezo sensors, linear or rotary potentiometers, pressure sensitive pads, gyro detectors, combinations thereof, or any other suitable sensor. In another example, the first sensor of each sensor unit may be one type of sensor while the second sensor of each sensor unit may be a different type.

The invention claimed is:

1. An occupant-support system comprising
a vehicle seat including a seat bottom adapted to move relative to a floor of a vehicle and a seat back coupled to the seat bottom to move relative to the seat bottom and
a seat-motion system including a seat-movement unit coupled to the vehicle seat to move the seat bottom and the seat back, a monitoring unit configured to provide sensor information in response to sensing occupant input, and a controller configured to receive sensor information from the monitoring unit and cause the seat-movement unit to move the vehicle seat based on the sensor information received,
wherein the monitoring unit includes a first seat-back sensor unit including a first sensor coupled to the seat back and arranged to face toward an occupant resting on the vehicle seat and a second sensor coupled to the seat back and arranged to face away from the occupant and the first and second sensors being arranged to lie in spaced-apart relation to one another to locate a portion of the vehicle seat therebetween;
wherein the controller is configured to determine a first amount of force sensed by the first sensor of the first seat-back sensor unit and a second amount of force sensed by the second sensor of the first seat-back sensor unit; and
wherein the controller is configured to command the seat-movement unit to cause the seat back to pivot toward the seat bottom when the first amount of force is greater than the second amount of force and pivot away from the seat bottom when the second amount of force is greater than the first amount of force.

2. The occupant-support system of claim 1, wherein the controller is configured to issue commands to the seat-movement unit only in response to receiving sensor information from both the first and second sensors so that unintended engagement of only the first sensor by the occupant resting on the vehicle seat does not cause movement of the vehicle seat.

3. The occupant-support system of claim 2, wherein the seat back includes a backrest, a first bolster coupled to the backrest to move therewith, and a second bolster coupled to the backrest in spaced-apart relation to the first bolster to locate the backrest therebetween and the first seat-back sensor unit is coupled to the first bolster.

4. The occupant-support system of claim 1, wherein the monitoring unit further includes a second seat-back sensor unit coupled to the seat back and located in spaced-apart relation to the first seat-back sensor unit between the seat bottom and the second seat-back sensor unit.

5. The occupant-support system of claim 4, wherein the seat back includes a backrest, a first bolster coupled to the backrest to move therewith, and a second bolster coupled to the backrest in spaced-apart relation to the first bolster to locate the backrest therebetween and the first seat-back sensor unit is coupled to the first bolster and the second seat-back sensor unit is coupled to the first bolster.

6. The occupant-support system of claim 5, wherein the controller is configured to issue commands to the seat-movement unit only in response to receiving sensor information from one of both the first and second sensors of the first seat-back sensor unit and the first and second sensors of the second seat-back sensor unit so that unintended engagement of only one of the first sensors by the occupant resting on the vehicle seat does not cause movement of the vehicle seat.

7. The occupant-support system of claim 5, wherein the monitoring unit further includes a seat-bottom sensor unit coupled to the seat bottom to move therewith, the seat-bottom sensor unit including a first sensor coupled to the seat bottom and arranged to face toward an occupant resting on the vehicle seat and a second sensor coupled to the seat bottom and arranged to face away from the occupant, the first and second sensors being arranged to lie in spaced-apart relation to one another to locate a portion of the seat bottom therebetween.

8. The occupant-support system of claim 7, wherein the seat bottom includes a cushion, a first bolster coupled to the cushion to move therewith, and a second bolster coupled to the cushion in spaced-apart relation to the first bolster to locate the cushion therebetween and the seat-bottom sensor unit is coupled to the first bolster of the seat bottom.

9. The occupant-support system of claim 8, the controller is configured to issue commands to the seat-movement unit only in response to receiving sensor information from the first and second sensors included in one of the first seat-back sensor unit, the second seat-back sensor unit, and the seat-bottom sensor unit.

10. The occupant-support system of claim 4, wherein the controller is configured to command the seat-movement unit to move the vehicle seat to a predetermined arrangement in response to the controller receiving sensor information from the first and second sensors included in the second seat-back sensor unit.

11. The occupant-support system of claim 10, wherein the controller is configured to command the seat-movement unit to move the seat back relative to the seat bottom in response to the controller receiving sensor information from the first and second sensors included in the first seat-back sensor unit.

12. The occupant-support system of claim 1, wherein each of the first and second sensors is a strain gauge.

13. The occupant-support system of claim 1, wherein the monitoring unit further includes a seat-bottom sensor unit coupled to the seat bottom to move therewith, the seat-bottom sensor unit including a first sensor coupled to the seat bottom and arranged to face toward an occupant resting on the vehicle seat and a second sensor coupled to the seat bottom and arranged to face away from the occupant, the first and second sensors being arranged to lie in spaced-apart relation to one another to locate a portion of the seat bottom therebetween.

14. The occupant-support system of claim 13, wherein the monitoring unit further includes a second seat-back sensor unit coupled to the seat back and located in spaced-apart relation to the first seat-back sensor unit between the seat bottom and the second seat-back sensor unit.

15. The occupant-support system of claim 13, wherein the seat bottom includes a cushion, a first bolster coupled to the cushion to move therewith, and a second bolster coupled to the cushion in spaced-apart relation to the first bolster to locate the cushion therebetween and the seat-bottom sensor unit is coupled to the first bolster of the seat bottom.

16. The occupant-support system of claim 15, the controller is configured to issue commands to the seat-movement unit only in response to receiving sensor information from one of both the first and second sensors of the first seat-back sensor unit and the first and second sensors of the seat-bottom sensor unit so that unintended engagement of only one of the first sensors by the occupant resting on the vehicle seat does not cause movement of the vehicle seat.

17. The occupant-support system of claim 13, wherein the controller is configured to command the seat-movement unit to release the seat bottom for movement in response to the controller receiving sensor information from the first and second sensors included in the seat-bottom sensor unit and to lock the seat bottom to block movement of the seat bottom in response to the controller no longer receiving sensor information from the first and second sensors included in the seat-bottom sensor unit.

18. The occupant-support system of claim 17, wherein the controller is configured to command the seat-movement unit to release the seat back for pivoting movement in response to the controller receiving sensor information from the first and second sensors included in the first seat-back sensor unit and to lock the seat back to block movement of the seat back in response to the controller no longer receiving sensor information from the first and second sensors included in the first seat-back sensor unit.

* * * * *